T859,010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 43

766,373

CURTAIN COATING METHOD FOR PACKAGING AN ARTICLE

Earl Quinn, % Kodak Park Works, Rochester, N.Y.

Continuation of application Ser. No. 541,413, Mar. 2, 1966. This application Sept. 30, 1968. Published Feb. 4, 1969

Class 264—90

2 Sheets Drawing. 10 Pages Specification

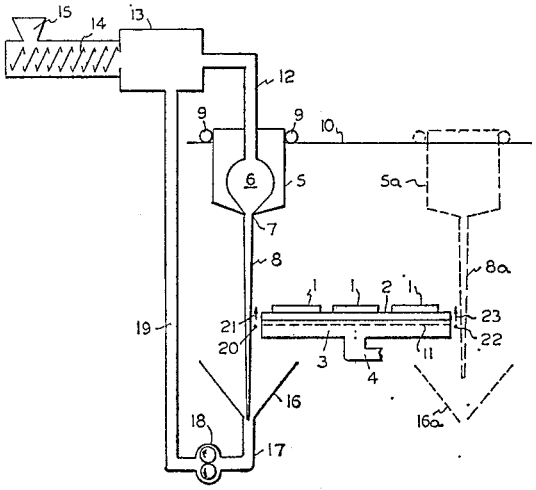

Figure 1:
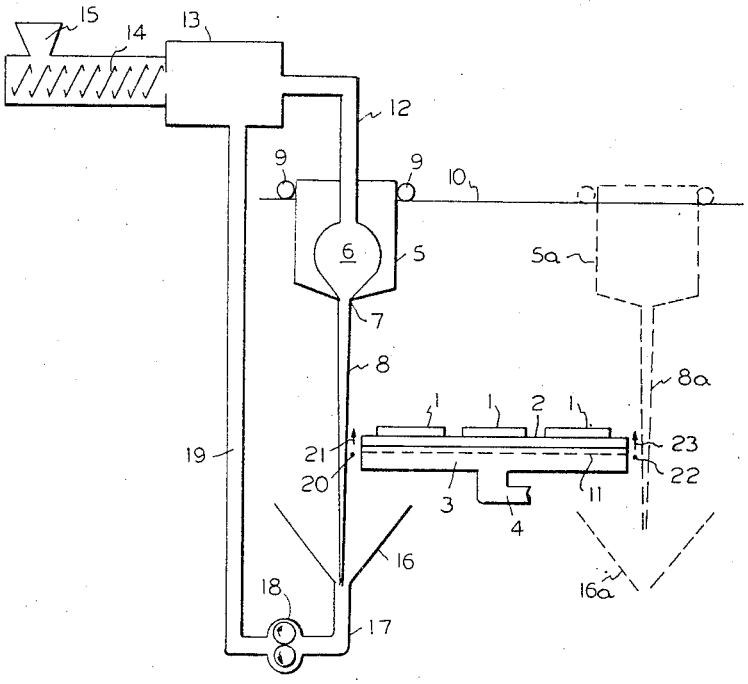
Figure 6:
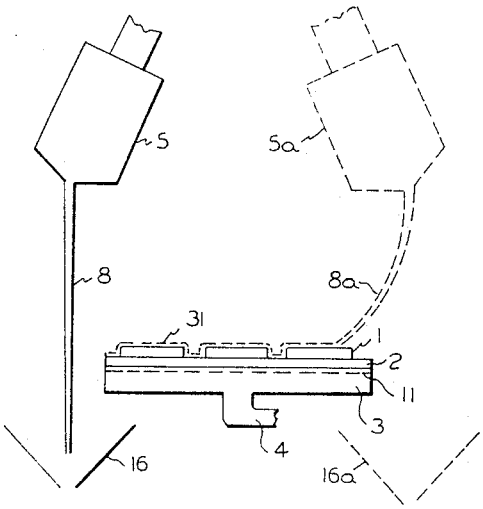
Figure 2:
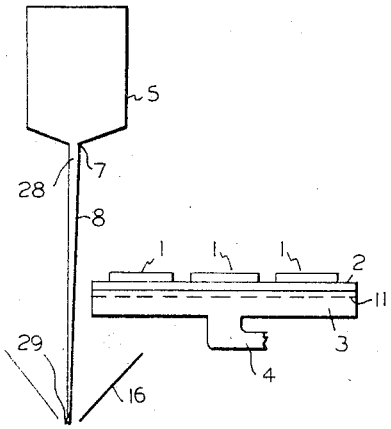
Figure 3:
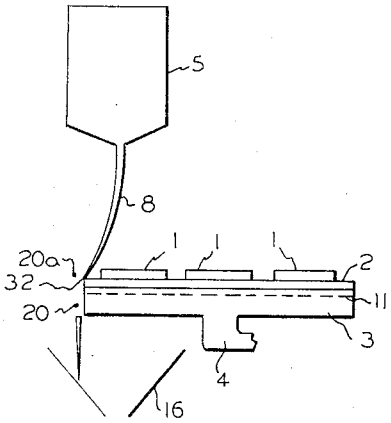
Figure 4:
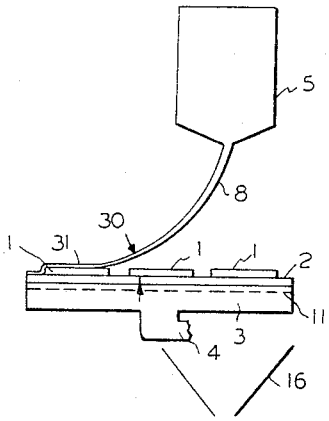
Figure 5:
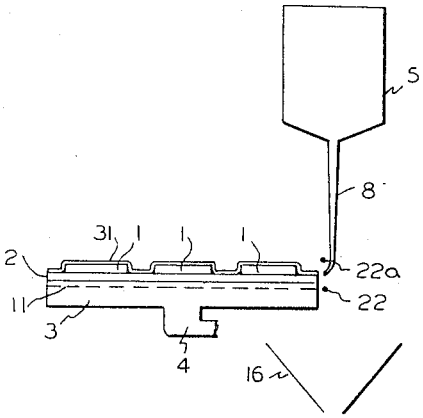

A method for curtain coating, as illustrated in FIGURE 1, wherein an article is placed upon an air-permeable substrate beneath which the air pressure is reduced. A curtain of a viscous, molten, thermoplastic coating composition is then moved over the article at a rate sufficient to cause the curtain to contact the upper surface of said substrate and said article at an angle which is not greater than about 45 degrees.

T 859,010

DEF. PUB. #766373

SHEET 1 OF 2

EARL QUINN
INVENTOR

BY Walter O. Hodsdon
Charles L. Good ATTORNEYS

T 859,010

DEF. PUB. #766373

SHEET 2 OF 2

EARL QUINN
INVENTOR

BY Walter O. Hodsdon
Charles L. Good
ATTORNEYS